United States Patent

Nohda et al.

[11] 4,247,200
[45] Jan. 27, 1981

[54] PROJECTION TYPE LENS METER

[75] Inventors: Masao Nohda; Kazuo Morohashi, both of Yokohama, Japan

[73] Assignee: Nippon Kogaku K.K., Tokyo, Japan

[21] Appl. No.: 971,437

[22] Filed: Dec. 20, 1978

[30] Foreign Application Priority Data

Dec. 26, 1977 [JP] Japan .................... 52-174037[U]

[51] Int. Cl.$^3$ .............................................. G01B 9/00
[52] U.S. Cl. ................................................. 356/124
[58] Field of Search ............................. 356/124–126; 353/64, 51, 73, 78, 98, 99

[56] References Cited

U.S. PATENT DOCUMENTS 3,958,257  5/1976  Johnson ........................... 354/83

FOREIGN PATENT DOCUMENTS 994547  11/1951  France ............................. 356/124
1527478  10/1978  United Kingdom .

OTHER PUBLICATIONS

Smith, Warren J., *Modern Optical Engineering*, McGraw Hill, New York, 1966, p. 41.
Topcon—Projection Lensmeter, Model LMP-2, published by Tokyo Kogaku Kikai K.K., Tokyo, Japan.

*Primary Examiner*—John K. Corbin
*Assistant Examiner*—Bruce Y. Arnold
*Attorney, Agent, or Firm*—Fitzpatrick, Cella, Harper & Scinto

[57] ABSTRACT

A projection type lens meter comprises a projection lens system consisting of a positive lens group and a negative lens group mutually separated by a large air gap, wherein the projecting light beam having passed through said two lens groups is made to pass through said air gap between said lens groups.

4 Claims, 1 Drawing Figure

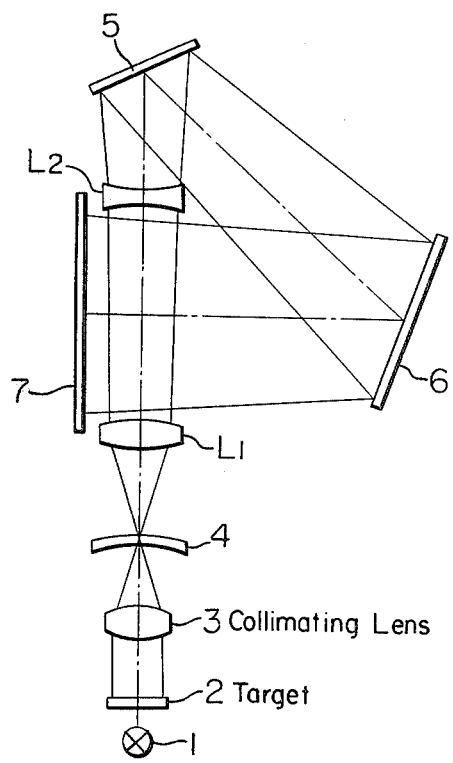

PROJECTION TYPE LENS METER

BACKGROUND OF THE INVENTION

1. Field of the Invention

The present invention relates to a projection type lens meter for measuring refractive power or astigmatic axis of spectacle lenses, and more particularly to an optical system adapted for use in such a projection type lens meter.

2. Description of the Prior Art

A projection lens meter requires a projection magnification of at least 30 to 40 times in order to achieve a satisfactory accuracy of measurement, so that there is usually employed a projection lens of focal length in a range of 800 to 1,000 mm. Because of such a long focal length the optical path from the projection lens to the screen constituting the image plane, that is, the back focus becomes inevitably long, requiring a large image space. Using a conventional projection type lens meter it is known to reduce the image space by folding the optical path with four mirrors. There are however certain limitations on the positions of the projection lens and of the screen in order to ensure satisfactory operational performance, and it is therefore difficult to reduce the dimension of the image space and to reduce the size of the projection type lens meter. Although the optical system itself may be accommodated within a smaller space by the use of a larger number of mirrors with corresponding increased number of reflections, it becomes impossible to obtain a projected image of a desired dimension due to vignetting of the light beam, and the manufacture of such optical system is extremely difficult as the adjustment of each reflecting surface becomes more complicated and has to be more accurate.

SUMMARY OF THE INVENTION

The object of the present invention, therefore, is to provide a projection type lens meter of simpler structure and of a smaller dimension than heretofore available.

According to the present invention, the projection type lens meter is featured by a projection lens system consisting of a positive lens group and a negative lens group mutually separated by a large air gap, and by an arrangement whereby the projecting light beam having passed through said two lens groups is made to pass through said air gap between said lens groups.

The present invention will be explained in detail in the following explanation with reference to the attached drawing, showing, in cross-sectional view, the structure of the optical system of a projection lens meter embodying the present invention.

BRIEF DESCRIPTION OF THE DRAWING

The attached drawing is a cross-sectional view of the optical system of a projection lens meter embodying the present invention.

DESCRIPTION OF THE PREFERRED EMBODIMENTS

Referring to the drawing, which illustrates the sytem components and the width of the effective light flux reaching the screen 7, it is seen that a light source 1 illuminates a target 2 which is axially displaceable around the focal point of a collimating lens 3. Thus, when said target 2 is located at a standard position, i.e. on said facal point, the light beam emerging from said target becomes parallel after passing through said collimating lens 3. Said light beam then passes through a lens 4 to be tested, and further passes through a positive lens L1 and a negative lens L2 separated by a significantly large distance from said positive lens. Upon reflection by a first mirror 5 and a second mirror 6, the light beam passes through a gap between said positive lens L1 and negative lens L2 to reach a screen 7 located in the vicinity of said lenses and substantially parallel to the optical axis thereof. Said positive lens L1 and negative lens L2 constitute a projection lens system and are mutually separated by a distance slightly larger than the final effective diameter of the projection light beam on said screen 7. Since the lens 4 to be tested is located on the rear focal point of said collimating lens 3, it is possible to determine the refractive power of said lens 4 in the already known manner as a proportional function of displacement of target 2 in the axial direction required for clearly focusing the image of said target 2 on the screen 7.

In the above-explained structure wherein the projection lens system is composed of a positive lens L1 and a negative lens L2, it is possible to significantly reduce the so-called back focus, namely the distance from the negative lens to the screen in comparison with the conventional projecting lens system composed of a single positive lens. Said distance, however, cannot be reduced drastically due to the associated aberrations. Nevertheless such aberrations can be sufficiently corrected if the positive lens L1 and the negative lens L2 are mutually separated by a distance large enough to allow the passage there between of the projection light beam. Besides, the image space can be made compact as the light path between said two lenses and the light path toward the screen 7 are arranged to cross each other.

Naturally the image space can be reduced by the crossing arrangement of the ligh paths, but the length of the image space can be made 2 minimum by selecting the distance between said positive lens L1 and negative lens L2 slightly larger than the final effective diameter of the projection light beam on the screen 7 thereby crossing the light beams with the largest effective diameter. The distance between said positive lens L1 and negative lens L2 need not necessarily be comparable to the final effective diameter of the projection light beam but can also be selected larger in such a manner that the negative lens L2 is positioned between said first mirror 5 and second mirror 6. Such arrangement is however not desirable as a larger effective diameter is required for the negative lens L2.

The back focus is shortened by the above mentioned arrangement of the projection lens system, and it is rendered possible, by passing the final portion of projecting light beam between two lenses, to realize a more compact apparatus than in the conventional apparatus with only two reflections by the first mirror 5 and second mirror 6. Consequently the deviation i.e., displacement of the image on the focusing screen and rotation of image resulting from reflections are reduced and the adjustment is rendered easier in comparison with the conventional structure utilizing four mirrors. Also, since the distance from the first reflecting mirror 5 to the screen 7 is rendered shorter than in the convenional case, the deviation of image on the screen resulning from the error in the angle of said mirror 5 is reduced and the precision of measurement during use is maintained high.

Also, the direction of astigmatic axis on the screen 7 is naturally not inverted as the projecting light beam is subjected to two reflections.

The following is a detailed explanation on the compsoition of the positive lens L1 and negative lens L2. Representing the focal lengths of positive lens L1 and of negative lens L2 and the synthesized focal length of said two lenses respectively by f1, f2 and F and the distance between said two lenses by d, there stands the following well known relation between these quantities:

$$F = f1 \cdot f2/(f1 + f2 - d) \quad (1)$$

Also the back focus B in this case can be represented by the following equation:

$$B = f2(f1 - d)/(f1 + f2 - d) \quad (2)$$

Assuming, for example, f1=400 mm, f2=−540 mm and d=130 mm, there are obtained F=800 mm from the equation (1) and B=540 mm from the equation (2). Consequently the distance from the positive lens L1 to the image plane is 690 mm. In contrast to the conventional projection lens system consisting of a single positive lens, which requires a back focus distance of approximately 800 mm for a focal length of 800 mm, the arrangement of the present invention allows a reduction for the same focal length, of the back focus distance by approximately 110 mm, or 14%.

The change ΔB in the back focus B as a function of a change Δd in the distance d between the positive lens L1 and negative lens L2 can be defined by the following equation (3) derived from the foregoing equations (1) and (2):

$$\left. \begin{array}{l} \Delta B = -\alpha \cdot \Delta d \\ \alpha = (F/f1)^2 \end{array} \right\} \quad (3)$$

This equation (3) indicates that the back focus B changes by an amount equal to the change in the distance d times a factor α. As α=4 in the foregoing example, a change in the distance d results in a change of back focus equal to four times said change in the distance d. Therefore, in the manufacture of the projection type lens meter of the present invention, it is possible to adjust the back focal length by slightly changing the distance between the positive lens and negative lens.

However, if it is intended to significantly reduce the back focus by shortening the focal lengths of said positive lens L1 and negative lens L2, the factor α assumes an extremely large value, resulting in a large change of the back focus even for a slight change in the distance between the lenses. Such arrangement is not suitable for practical use since the image on the screen is easily affected for example by vibration and since the adjustment of distance between the lenses becomes unpractically difficult. Also for this reason it is advantageous to select the distance between said positive lens L1 and negative lens L2 slightly larger than the final effective diameter of the projecting light beam.

As explained in detain in the foregoing, the present invention provides a projection lens meter of a simplified structure and of a small dimension. Besides, in the manufacturing stage, adjustment of deviation and rotation of image is facilitated since the number of reflecting surfaces is reduced, and the adjustment of back focus distance is easily achievable. Also the danger of deterioration of measuring accuracy during the use is reduced.

Though in the foregoing example the screen 7 is arranged parallel to the optical axis of first lens L1, namely in a vertical position, it is possible to provide the screen in an upright position in order to facilitate observation.

We claim:

1. A projection lens meter for measuring refractive power and angle of astigmatic axis of an optical system to be tested, comprising:
    (a) a target member;
    (b) light source means for illuminating said target member;
    (c) a collimating lens system for changing the light from said target member into a substantially parallel light beam;
    (d) a projection lens system for focusing the light beam passing through said collimating lens system and said optical system to be tested, said projection lens system comprising a positive lens group and a negative lens group provided on the emerging light side of said positive lens group and separated therefrom by a predetermined large distance;
    (e) reflecting members for guiding the light beam from said projection lens system to traverse a light path from said positive lens group to said negative lens group; and
    (f) a screen member comprising a screen plane on which is focused the light beam reflected by the mirrors and passed through said light path.

2. A projection lens meter according to the claim 1 wherein said screen member is provided in the vicinity of said projection lens system and the distance between said positive lens group and negative lens group of said projection lens system is slightly larger than the final effective diameter of the light beam reaching said screen plane.

3. A projection lens meter according to claim 2 wherein said reflecting members comprise two mirrors.

4. A projection lens meter according to claim 1 wherein said target member is axially displaceable around a standard position of said collimating lens system.

* * * * *

UNITED STATES PATENT AND TRADEMARK OFFICE
CERTIFICATE OF CORRECTION

PATENT NO. : 4,247,200
DATED : January 27, 1981
INVENTOR(S) : MASAO NOHDA, ET AL It is certified that error appears in the above-identified patent and that said Letters Patent are hereby corrected as shown below:

Column 2, line 1, change "facal" to --focal--;

Column 2, line 39, change "2" to --a--.

Column 4, line 4, change "detain" to --detail--;

Column 4, line 40, change "mirrors" to --reflecting members--.

Signed and Sealed this

Twenty-eighth Day of April 1981

[SEAL]

Attest:

RENE D. TEGTMEYER

Attesting Officer    Acting Commissioner of Patents and Trademarks